United States Patent

[11] 3,620,710

| | | |
|---|---|---|
| [72] | Inventor | Werner Schwarze<br>Frankfurt am Main, Germany |
| [21] | Appl. No. | 884,733 |
| [22] | Filed | Dec. 12, 1969 |
| [45] | Patented | Nov. 16, 1971 |
| [73] | Assignee | Deutsche Gold-und Silber-Scheideanstalt<br>Vormals Roessler<br>Frankfurt am Main, Germany |
| [32] | Priorities | July 16, 1966 |
| [33] | | Germany |
| [31] | | D 50 605;<br>Nov. 22, 1966, Germany, No. D 51 608<br>Original application Nov. 20, 1967, Ser.<br>No. 684,514, now Patent No. 3,505,325,<br>continuation-in-part of Ser. No. 652,036,<br>July 10, 1967, abandoned. |

[51] Int. Cl. .................................................. A01m 9/22
[50] Field of Search .......................................... 71/93

[56]  References Cited
UNITED STATES PATENTS 3,415,827 12/1968 Nikles et al. .................. 71/93 X
3,488,181 1/1970 Nikles .......................... 71/93

[54] PLANT GROWTH REGULATING COMPOSITIONS INCLUDING CYANOALKYLAMINO SUBSTITUTED TRIAZINES
17 Claims, No Drawings

[52] U.S. Cl. ................................................. 71/93,
71/74

Primary Examiner—James O. Thomas, Jr.
Attorney—Michael S. Striker

ABSTRACT: Herbicidal composition comprising, in an agriculturally acceptable carrier, compounds of the formula

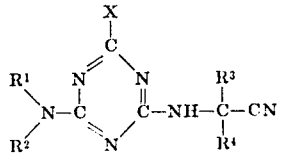

wherein X is a halogen atom, lower alkoxy, lower alkyl mercapto,

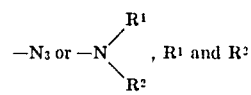 , $R^1$ and $R^2$ being hydrogen, lower alkyl, lower alkenyl, or lower alkyl or alkenyl substituted with —OH, —OR, —SR or —CN, R being lower alkyl, and wherein one of $R^3$ and $R^4$ is alkyl or alkenyl having from one to eight carbon atoms and wherein $R^3$ and $R^4$ together with the adjoining carbon atom form a five to seven membered cycloalkyl ring; and a method of regulating growth of plants therewith.

PLANT GROWTH REGULATING COMPOSITIONS INCLUDING CYANOALKYLAMINO SUBSTITUTED TRIAZINES

CROSS-REFERENCES TO RELATED APPLICATIONS

This application is a division of application, Ser. No. 684,514 filed by the same inventor in respect of "NOVEL CYANOALKYLAMINO SUBSTITUTED TRIAZINES HAVING PLANT GROWTH REGULATING ACTION," on Nov. 20, 1967, now U.S. Pat. No. 3,505,325 which latter application, in turn, was a continuation-in-part of application, Ser. No. 652,036, filed by the same inventor on July 10, 1967 and which now is abandoned.

BACKGROUND OF THE INVENTION

The invention relates to compositions in which the effective agents are cyanoalkylamino substituted s-triazines having plant growth regulating and, especially, herbicidal properties.

Herbicides have become known which contain an s-triazine ring and in the 2-position carry an azido or alkyl mercapto group or halogen and in 4-position carry a cyanoalkylamino group as active ingredient (Belgian Pat. Nos. 656,233 and 644,355). However, in these compounds the cyano group is directly attached to a primary carbon atom and compounds of this type do not reach the activity of the best products available commercially.

A number of herbicidal substituted bisalkylamino triazines have also become known. Some have, in practice, been found to be excellent herbicides, such as, for example, 2,4-bis-ethylamino-6-chloro-triazine, 2-ethylamino-4-isopropylamino-6-chlorotriazine, 2-methylamino-4-isopropylamino-6-methylmercapto-triazine and 2,4-bis-isopropylamino-6-methylmercapto-triazine. These compounds all contain two alkyl amino groups. 2-amino-4-alkylamino-triazines with strong herbicidal activity have not become known.

SUMMARY OF THE INVENTION

The invention concerns a plant growth regulating composition which comprises (a) a cyanoalkylamino substituted triazine of the formula

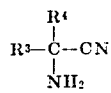

wherein X is a halogen atom, lower alkoxy, lower alkyl mercapto,

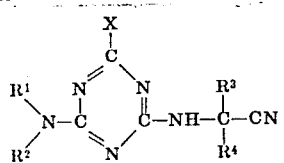

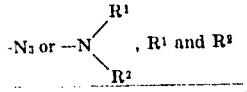, $R^1$ and $R^2$ being hydrogen or lower alkyl or alkenyl or lower alkyl or alkenyl substituted with $-OH$, $-OR$, $-SR$ or $-CN$, R being lower alkyl, and wherein one of $R^3$ and $R^4$ is alkyl or alkenyl having from one to eight carbon atoms and wherein $R^3$ and $R^4$ together with the adjoining carbon atom form a five to seven membered ring and (b) an agriculturally acceptable carrier for said triazine compound.

The invention also embraces a method of regulating or controlling the growth of plants with these compositions.

DESCRIPTION OF THE PREFERRED EMBODIMENTS

According to the invention it was found that cyanoalkylamino-s-triazines as described above in which the cyano group is directly connected to a secondary or preferably a tertiary carbon atom which is also directly attached to the amino group on the triazine ring are marked by their especially high and selective herbicidal activity and are rapidly decomposed in the soil. In the description the term "lower" as in lower alkyl, lower alkoxy and lower alkenyl is intended to signify groups with one to four carbon atoms.

The compounds can be prepared by conventional methods known to those skilled in the art. For instance, 1 mol of cyanuric chloride can be reacted with 1 mol of an amino nitrile of the formula $$R^3-\underset{\underset{NH_2}{|}}{\overset{\overset{R^4}{|}}{C}}-CN$$

in the presence of a hydrogen halide binding agent, such as aqueous NaOH and subsequently with 1 mol of ammonia or amine of the formula $NHR^1R^2$, also in the presence of 1 mol of aqueous NaOH. Suited nitrile for this purpose, for example, are:

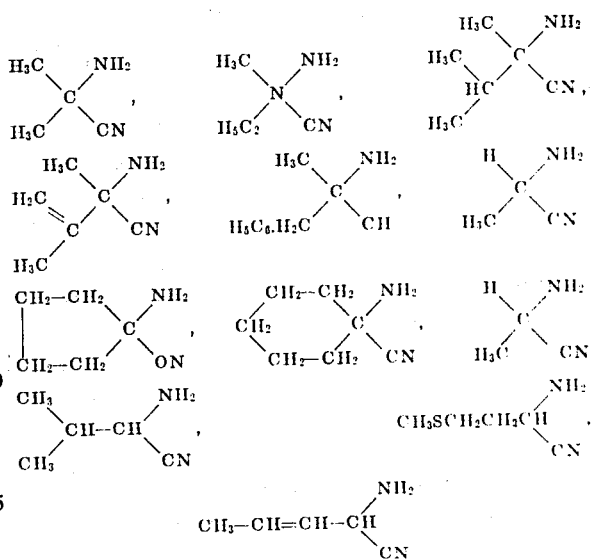

These alpha-nitriles are produced by conventional methods, such as, for instance, by first reacting ketones or aldehydes with hydrocyanic acid in the presence of an alkaline catalyst to form the corresponding cyano hydrine and reacting the latter with ammonia to produce the desired amino nitrile. The synthesis also can be carried out in one process step by reacting the ketone or aldehyde, hydrocyanic acid and ammonia with or without a diluent. A mixture of ammonium chloride and alkali metal cyanide can be used instead of free hydrocyanic acid. In the latter instance the reaction is carried out in the presence of water. The alpha-amino nitriles are water white liquids which can be distilled under vacuum. They are relatively unstable but can be kept in a refrigerator (0° C.) for several days without decomposition.

The alkyl mercapto derivatives can, for instance, be produced by reaction of the corresponding chloro substituted triazines with an alkyl mercaptan in the presence of an acid binding agent. It is also possible to start from 2-alkyl-mercapto-4,6-dichlorotriazines which are sequentially reacted with an amino nitrile in the presence of an acid binding agent and in the presence of an amine again in the presence of an acid binding agent. It furthermore is possible first to introduce an amino group into the triazine and then the alkyl mercapto group and, finally again an amino group (starting, for instance, from cyanuric chloride).

The alkoxy derivatives, for instance, can be produced in high yields by reacting the corresponding chloro substituted triazines with sodium or potassium alcoholates in an alcohol at raised temperatures and, if desired, raised pressures. The cyanuric chloride also can first be converted to the 2-alkoxy-2,4-dichlorotriazine by conventional methods, for example, by reacting of cyanuric chloride with alcohol in collidine and then reacting the intermediate with the amino nitrile and the amine in any desired sequence. It is also possible analogously to start with a 2-alkyl-amino-2,4-chlorotriazine and reacting this with an alcohol and with an amino nitrile in any desired sequence.

Azido triazines of the type concerned can be produced by reaction of chlorotriazine with an alkali metal or ammonium azide in dimethyl formamide or dimethyl sulfoxide or even better by reacting such azides with a quarternary methyl ammonium compound in water.

Another method for the production of the compounds used in the compositions of the invention involves starting from a 2-amino-, alkyl amino- or cyanalkyl amino-2,4-dichlorotriazine and such compound is converted to the 2-amino, alkyl amino- or cyanalkyl amino-4-azido-6-chlorotriazine by reaction with an aqueous alkali metal azide solution in the presence of appropriate solvents such as acetone or tetrahydrofuran. The intermediate azido compound is then converted to the desired product with an amino nitrile, ammonia or an amine.

The compounds are marked by their superior herbicidal properties and can be used as preemergence or postemergence herbicides. They are already able to influence the growth of plants when applied in low concentrations. Depending upon the nature of substituents $R^1$ to $R^4$, they can be used for the destruction or selective suppression of weeds among cultured plants, as well as for the total destruction and prevention of undesired plant growth.

The compositions of the invention can also be used, for example, for defoliation, reduction of set of fruit, delay in flowering. They can be used individually or in admixture with each other or also with insecticides, fungicides and fertilizers.

The following is a tabulation of compounds according to the invention having the structural formula given in the Summary of the Invention with the substituent X and $R^1$ to $R^4$ indicated.

| X | $R^1$ | $R^2$ | $R^3$ | $R^4$ | Melting point, °C. | Appearance |
|---|---|---|---|---|---|---|
| Cl | H | H | $CH_3$ | $CH_3$ | 191–192 | White crystals. |
| Cl | H | H | $CH_3$ | $C_2H_5$ | 178–179 | Do. |
| Cl | H | $CH_3$ | $CH_3$ | $CH_3$ | 201–202 | Do. |
| Cl | H | $CH_3$ | $CH_3$ | $C_2H_5$ | 151–152 | Do. |
| Cl | H | $CH_3$ | $CH_3$ | $C_4H_9$-i | 141–142 | Do. |
| Cl | H | $CH_3$ | $C_2H_5$ | $C_2H_5$ | 177–178 | Do. |
| Cl | H | $CH_3$ | \multicolumn{2}{c}{cyclohexylidene} | 183–184 | Do. |
| Cl | H | $C_2H_5$ | $CH_3$ | $CH_3$ | 161–162 | Do. |
| Cl | H | $C_2H_5$ | $CH_3$ | $C_2H_5$ | 136–137 | Do. |
| Cl | H | $C_2H_5$ | $CH_3$ | $-C(CH_3)=CH_2$ | 141 | Do. |
| Cl | H | $C_2H_5$ | \multicolumn{2}{c}{cyclohexylidene} | 134–136 | Do. |
| Cl | H | $C_2H_5$ | $C_2H_5$ | $C_2H_5$ | 161–162 | Do. |
| Cl | H | $C_3H_7$-i | $CH_3$ | $CH_3$ | 188–189 | Do. |
| Cl | H | $C_3H_7$-i | $CH_3$ | $C_2H_5$ | 156 | Do. |
| Cl | H | $C_3H_7$-i | $CH_3$ | $C_3H_7$-n | 148–149 | Do. |
| Cl | H | $C_3H_7$-i | $CH_3$ | $C_4H_9$-i | 121 | Do. |
| Cl | H | $C_4H_9$-n | $CH_3$ | $CH_3$ | 149–150 | Do. |
| Cl | H | $CH_2CH_2CH_2OCH_3$ | $CH_3$ | $CH_3$ | 124–125 | Do. |
| Cl | H | $CH_2CH_2SCH_3$ | $CH_3$ | $CH_3$ | 127–129 | Do. |
| Cl | H | $CH_2CN$ | $CH_3$ | $CH_3$ | 166–167 | Do. |
| Cl | H | $CH_2CH_2OH$ | $CH_3$ | $CH_3$ | 148–149 | Do. |
| Cl | H | $CH_2 \cdot CH=CH_2$ | $CH_3$ | $CH_3$ | 136–138 | Do. |
| $SCH_3$ | H | $CH_3$ | $CH_3$ | $CH_3$ | 124–125 | Do. |
| $SCH_3$ | H | $C_3H_7$-i | $CH_3$ | $CH_3$ | 141–143 | Do. |
| $SCH_3$ | H | $CH_3$ | $C_2H_5$ | $C_2H_5$ | 118–120 | Do. |
| $SCH_3$ | H | $C_3H_7$-i | $C_2H_5$ | $C_2H_5$ | 103–105 | Do. |
| $SCH_3$ | H | $CH_2C_6H_5$ | $CH_3$ | $CH_3$ | 126–128 | Do. |
| $SCH_3$ | H | $CH_2 \cdot CH=CH_2$ | $CH_3$ | $CH_3$ | 83–85 | Do. |
| $SCH_3$ | H | $CH_2CH_2OH$ | $CH_3$ | $CH_3$ | 99–100 | Do. |
| $SCH_3$ | H | $C_2H_5$ | \multicolumn{2}{c}{cyclohexylidene} | 113–115 | Do. |
| $OOH_3$ | H | $CH_3$ | $C_2H_5$ | $C_2H_5$ | 129–131 | Do. |
| $OOH_3$ | H | $CH_3$ | $CH_3$ | $CH_3$ | 103–104 | Do. |
| $OOH_3$ | H | $C_2H_5$ | $CH_3$ | $CH_3$ | 91–92 | Do. |
| $OOH_3$ | H | $C_2H_5$ | $C_2H_5$ | $C_2H_5$ | 90–91 | Do. |
| $N_3$ | H | $CH_3$ | $CH_3$ | $CH_3$ | 132–134 | Do. |
| $N_3$ | H | $C_3H_7$-i | $CH_3$ | $CH_3$ | 84–85 | Do. |

| X | R¹ | R² | R³ | R⁴ | Melting point, °C | Appearance |
|---|---|---|---|---|---|---|
| N₃ | C₂H₅ | C₂H₅ | CH₃ | CH₃ | 77-79 | Do. |
| N₃ | H | CH₃ | CH₃ | C₂H₅ | 128-129 | Do. |
| N₃ | H | C₂H₅ | CH₃ | CH₃ | 92-94 | Do. |
| CH₃HH | H | C₃H₇-i | CH₃ | CH₃ | 90-91 | Do. |
| C₂H₅HH | H | C₃H₇-i | CH₃ | CH₃ | 91-92 | Do. |
| C₂H₅HH | H | C₂H₅ | CH₃ | CH₃ | 81-82 | Do. |
| Cl | CH₃ | CH₃ | CH₃ | CH₃ | 109-110 | Do. |
| Cl | C₂H₅ | C₂H₅ | CH₃ | CH₃ | 92-93 | Do. |
| Cl | H | (CH₂)₂CN | CH₃ | CH₃ | 189-190 | Do. |
| Cl | H | C(CH₃)₂CN | CH₃ | CH₃ | 183-185 | Do. |
| Cl | H | (CH₂)₃OC₂H₅ | CH₃ | CH₃ | 114-115 | Yellowish crystals. |
| Cl | H | (CH₂)₃OC₃H₇-i | CH₃ | CH₃ | 122 | White crystals. |
| Cl | H | C₄H₇-n | CH₃ | C₂H₅ | 129-131 | Do. |
| Cl | C₂H₅ | C₂H₅ | CH₃ | C₂H₅ | 60-62 | Do. |
| Cl | H | CH₂CH₂CH | CH₃ | C₂H₅ | 140-141 | Do. |
| Cl | H | (CH₂)₃OCH₃ | CH₃ | C₂H₅ | 69-70 | Do. |
| Cl | H | (CH₂)₃SCH₃ | CH₃ | C₂H₅ | 99-100 | Do. |
| Cl | H | H | CH₃ | C₃H₇-n | 145 | Do. |
| Cl | H | CH₃ | CH₃ | C₃H₇-n | 118-121 | Do. |
| Cl | H | C₂H₅ | CH₃ | C₃H₇-n | 124-126 | Do. |
| Cl | H | (CH₂)₃OCH₃ | CH₃ | C₃H₇-n | 64-65 | Do. |
| Cl | H | H | CH₃ | C₃H₇-i | 140 | Do. |
| Cl | H | CH₃ | CH₃ | C₃H₇-i | 140 | Do. |
| Cl | H | C₂H₅ | CH₃ | C₃H₇-i | 120-121 | Do. |
| Cl | H | C₃H₇-i | CH₃ | C₃H₇-i | 130 | Do. |
| Cl | H | (CH₂)₃OCH₃ | CH₃ | C₃H₇-i | 115 | Do. |
| Cl | H | (CH₂)₃SCH₃ | CH₃ | C₃H₇-i | 91-92 | Do. |
| Cl | H | H | C₂H₅ | C₂H₅ | | Do. |
| Cl | H | C₃H₇-i | C₂H₅ | C₂H₅ | 153-154 | Do. |
| Cl | H | (CH₂)₃OCH₃ | C₂H₅ | C₂H₅ | 81-83 | Do. |
| Cl | H | H | CH₃ | C₃H₉-i | 153-155 | Do. |
| Cl | H | C₂H₅ | CH₃ | C₄H₉-i | 120 | Do. |
| Cl | H | H | CH₃ | C₅H₁₁-n | 105 | Do. |
| Cl | H | CH₃ | CH₃ | C₅H₁₁-n | 78 | Do. |
| Cl | H | C₂H₅ | CH₃ | C₅H₁₁-n | 120 | Do. |
| Cl | H | C₃H₇-i | CH₃ | C₅H₁₁-n | 110 | Do. |
| Cl | H | H | CH₃ | C₅H₁₁-i | 135 | Do. |
| Cl | H | CH₃ | CH₃ | C₅H₁₁-i | 75 | Do. |
| Cl | H | C₂H₅ | CH₃ | C₅H₁₁-i | 120 | Do. |
| Cl | H | C₃H₇-i | CH₃ | C₅H₁₁-i | 110 | Do. |
| Cl | H | CH₃ | C₃H₇-n | C₃H₇-n | 152-154 | Do. |
| Cl | H | C₂H₅ | \c<CH₂-CH₂ / CH₂-CH₂ | | 155 | Do. |
| Cl | H | C₃H₇-i | \c<CH₂-CH₂ / CH₂-CH₂ | | 200-201 | Do. |
| Cl | H | H | \c<CH₂-CH₂-CH₂ / CH₂-CH₂ | | 213 | Do. |
| Cl | H | C₃H₇-i | \c<CH₂-CH₂-CH₂ / CH₂-CH₂ | | 156-157 | Do. |
| OCH₃ | H | H | CH₃ | CH₃ | 195 | Do. |
| OCH₃ | H | C₃H₇-i | CH₃ | CH₃ | 105-107 | Do. |
| OCH₃ | C₂H₅ | C₂H₅ | CH₃ | CH₃ | 99-100 | Do. |
| OCH₃ | H | (CH₂)₃OCH₃ | CH₃ | CH₃ | 81-82 | Do. |
| OCH₃ | H | (CH₂)₃OC₂H₅ | CH₃ | CH₃ | | Yellow oil. |
| OCH₃ | H | H | CH₃ | C₂H₅ | 130 | White crystals. |
| OCH₃ | H | CH₃ | CH₃ | C₂H₅ | 115-117 | Do. |
| OCH₃ | H | C₄H₉-t | CH₃ | C₂H₅ | | Amorphous. |
| OCH₃ | H | (CH₂)₃OCH₃ | CH₃ | C₂H₅ | | Oil. |
| OCH₃ | H | H | CH₃ | C₃H₇-i | 149-150 | White crystals. |
| OCH₃ | H | CH₃ | CH₃ | C₃H₇-i | 135 | Do. |
| OCH₃ | H | C₂H₅ | CH₃ | C₃H₇-i | 114 | Do. |
| OCH₃ | H | CH₃ | CH₃ | C₅H₁₁-n | 105 | Do. |
| OCH₃ | H | H | \c<CH₂-CH₂ / CH₂-CH₂ | | 180 | Do. |
| OC₂H₅ | H | C₂H₅ | CH₃ | CH₃ | 129-131 | Do. |
| OC₂H₅ | H | C₂H₅ | CH₃ | C₂H₅ | 106-107 | Do. |
| SCH₃ | H | H | CH₃ | CH₃ | 230 | Do. |
| SCH₃ | H | C₂H₅ | CH₃ | CH₃ | 100 | Do. |
| SCH₃ | C₂H₅ | C₂H₅ | CH₃ | CH₃ | | Oil. |
| SCH₃ | H | C₄H₉-i | CH₃ | CH₃ | 83-84 | White crystals. |
| SCH₃ | H | (CH₂)₃OCH₃ | CH₃ | CH₃ | 110-111 | Do. |
| SCH₃ | H | (CH₂)₃SCH₃ | CH₃ | CH₃ | 69-70 | Do. |
| SCH₃ | H | H | CH₃ | C₂H₅ | 135 | Do. |
| SCH₃ | H | CH₃ | CH₃ | C₂H₅ | 121-122 | Do. |
| SCH₃ | H | C₂H₅ | CH₃ | C₂H₅ | | Do. |
| SCH₃ | C₂H₅ | C₂H₅ | CH₃ | C₂H₅ | | Yellow oil. |
| SCH₃ | H | C₃H₇-i | CH₃ | C₂H₅ | 91-92 | White crystals. |
| SCH₃ | H | CH₂CH₂CN | CH₃ | C₂H₅ | 110-112 | Do. |
| SCH₃ | H | H | CH₃ | C₃H₇-i | 212-214 | Do. |
| SCH₃ | H | CH₃ | CH₃ | C₃H₇-i | 122-124 | Do. |
| SCH₃ | H | C₃H₇-i | CH₃ | C₃H₇-i | 129-131 | Do. |
| SCH₃ | H | C₂H₅ | CH₃ | C₅H₁₁-i | 93-94 | Do. |
| SCH₃ | H | H | \c<CH₂-CH₂ / CH₂-CH₂ | | 191-193 | Do. |

| X | R¹ | R² | R³ | R⁴ | Melting point, °C | Appearance |
|---|----|----|----|----|-------------------|------------|
| SCH₃ | H | CH₃ | \C(CH₂-CH₂)(CH₂-CH₂)CH₂/ | | 139-141 | Do. |
| SCH₃ | H | C₃H₇-i | \C(CH₂-CH₂)(CH₂-CH₂)CH₂/ | | 127-128 | Do. |
| SC₂H₅ | H | C₂H₅ | CH₃ | CH₃ | 126-127 | Do. |
| SC₂H₅ | H | C₂H₅ | CH₃ | C₂H₅ | 83-84 | Do. |
| SC₃H₇-n | H | C₂H₅ | CH₃ | CH₃ | 96-97 | Do. |
| SC₃H₇-n | H | C₂H₅ | CH₃ | C₂H₅ | 71-72 | Do. |
| N₃ | H | H | CH₃ | CH₃ | 193 | Do. |
| N₃ | H | C₂H₅ | CH₃ | CH₃ | 102-105 | Do. |
| N₃ | H | (CH₂)₃OCH₃ | CH₃ | CH₃ | 92-93 | Do. |
| N₃ | H | H | CH₃ | C₂H₅ | 128-130 | Do. |
| N₃ | H | C₃H₇-i | CH₃ | C₂H₅ | 69-70 | Do. |
| N₃ | H | (CH₂)₃OCH₃ | CH₃ | C₂H₅ | 78-79 | Do. |
| N₃ | H | H | CH₃ | C₃H₇-i | 164-165 | Do. |
| N₃ | H | (CH₂)₃OCH₃ | CH₃ | C₃H₇-i | 109-111 | Do. |
| N₃ | H | CH₃ | CH₃ | C₄H₉-i | 130 | Do. |
| N₃ | H | CH₃ | CH₂ | C₅H₁₁-n | 97-98 | Do. |
| N₃ | H | CH₃ | CH₃ | C₅H₁₁-i | 105 | Do. |
| N₃ | H | C₂H₅ | CH₃ | C₅H₁₁-i | 120 | Do. |
| N₃ | H | H | \C(CH₂-CH₂)(CH₂-CH₂)CH₂/ | | 201 | Do. |
| NHC₂H₅ | H | C₂H₅ | CH₃ | C₂H₅ | 85-87 | Do. |
| NHC₂H₅ | H | C₃H₇-i | CH₃ | C₂H₅ | 100-103 | Do. |
| Cl | H | H | CH₃ | H | 198-200 | Do. |
| Cl | H | C₃H₇-i | CH₃ | H | 200-201 | Do. |
| Cl | H | C₂H₅ | i-C₃H₇ | H | 136-137 | Do. |
| Cl | H | C₃H₇-i | i-C₃H₇ | H | 140-142 | Do. |
| Cl | H | C₂H₅ | n-C₃H₇ | H | 185 | Do. |
| Cl | H | -CH₂-CH₂-CH₂-OCH₃ | CH₃ | H | 131-132 | Do. |
| OCH₃ | H | C₃H₇-i | CH₃ | H | 94-95 | Do. |
| OCH₃ | H | -CH₂-CH₂-CH₂-OCH₃ | CH₃ | H | 87-88 | Do. |
| SCH₃ | H | C₂H₅ | CH₃ | H | 79-81 | Do. |
| OCH₃ | H | C₂H₅ | CH₃ | H | 94-95 | Do. |
| N₃ | H | C₃H₇-i | CH₃ | H | 86-87 | Do. |
| N₃ | H | C₂H₅ | CH₃ | H | 91-92 | Do. |
| N₃ | H | -CH₂-CH₂-CH₂-OCH₃ | CH₃ | H | 104-105 | Do. |
| Cl | H | CH₃ | CH₃ | H | 175-176 | Do. |
| Cl | H | C₂H₅ | C₂H₅ | H | 108-109 | Do. |
| Cl | H | CH₃ | C₃H₇-i | H | 148-149 | Do. |
| Cl | H | C₂H₅ | C₆H₅ | H | 171-173 | Do. |

It was very surprising and unexpected that the triazines according to the invention which contain a tertiary or secondary C atom attached directly to an amino group and directly to a cyano group would be extremely string herbicides as corresponding compounds containing a carboxamide, a carboxy or a carboalkoxy group instead of the cyano group, such as for instance 2-chloro-4-ethylamino-6-(1)-methyl-1-carbamoylethyl)-amino-s-triazine and 2-chloro-4-ethylamino-6-(1-methyl-1-carboxy-ethyl)-amino-s-triazine have no phytotoxic action whatsoever.

The excellent herbicidal action of the compounds according to the invention therefore depends upon the presence of the cyano group which must be bound directly to a tertiary or a secondary C atom. Cyanoalkylamino triazines which carry the group –NH–(CH₂)ₙ–CN are much less active.

The chlorotriazines which have been introduced in practice have a long persistence in soil, which often is undesired. In comparison therewith the triazines according to the invention are decomposed in soil in a relatively short period of time.

The chlorotriazines according to the invention are very selective in corn cultures. In this connection they, for example, resemble 2,4-bis-ethylamino-6-chloro-triazine. However, they have the advantage over this compound in that they are decomposed in the soil to substances without herbicidal action after only one culture period. It therefore is not necessary to sow corn again in the same fields in the following year.

The compounds according to the invention with the following substituents have good selectivity in corn cultures:

| X | R¹ | R² | R³ | R⁴ |
|---|----|----|----|----|
| Cl | H | H | CH₃ | CH₃ |
| Cl | H | CH₃ | CH₃ | CH₃ |
| Cl | H | C₂H₅ | CH₃ | CH₃ |
| Cl | H | C₃H₇-i | CH₃ | CH₃ |
| Cl | H | H | CH₃ | C₂H₅ |
| Cl | H | CH₃ | CH₃ | C₂H₅ |
| Cl | H | C₂H₅ | CH₃ | C₂H₅ |
| Cl | H | C₃H₇-n | CH₃ | C₂H₅ |
| OCH₃ | H | H | CH₃ | CH₃ |

The selectivity of the compounds according to the invention, however, is not restricted to corn. They also have herbicidal selectivity in cultures other than corn, depending on their constitution as illustrated by way of example by the following: (selective in wheat)

| | | Selective in wheat | | |
|---|----|----|----|----|
| X | R¹ | R² | R³ | R⁴ |
| Cl | H | C₃H₇-i | CH₃ | C₃H₇-i |
| Cl | H | CH₃ | C₂H₅ | C₂H₅ |
| SCH₃ | H | CH₃ | CH₃ | C₃H₇-i |

| | | Selective in rice | | |
|---|----|----|----|----|
| Cl | H | CH₃ | CH₃ | C₃H₇-i |
| Cl | H | CH₃ | \C(CH₂-CH₂)(CH₂-CH₂)CH₂/ | |
| Cl | H | CH₃–CH=CH₂ | CH₃ | CH₃ |
| SCH₃ | H | C₂H₅ | CH₃ | C₂H₅ |

| | | Selective in cotton | | |
|---|----|----|----|----|
| SCH₃ | H | C₃H₇-i | CH₃ | CH₃ |
| SCH₃ | H | CH₃ | C₂H₅ | C₂H₅ |
| OCH₃ | H | C₂H₅ | CH₃ | CH₃ |
| SCH₃ | H | C₂H₅ | CH₃ | CH₃ |

The compounds according to the invention, depending upon their substituents, display an outstanding preemergence and/or postemergence activity. In most instances they are crystalline and have good solubility in many organic solvents.

This differentiates them from the known bis-alkylaminochloro triazines which are very difficulty soluble in most usual solvents. The novel compounds therefore are well adapted for spraying over fields from airplanes in the form of solutions in solvents.

The following, for instance, come into consideration as solvents for the compounds according to the invention: alcohols, ketones, hydrocarbons, halogenated hydrocarbons, for instance chloronaphthalene, mineral oils such as diesel oil, vegetable oils or mixtures thereof.

The novel triazine compounds can also be applied to solid carriers. As such, all known agricultural carriers come into consideration, for example: alumina, kaolin, kieselguhr, bentonite, talc, finely ground calcium carbonate, charcoal, wood four and the like. The active compounds can be admixed in dry form with the carriers. However, it is also possible to spray solutions or emulsions on or mix them with the carriers and drying the resulting mixtures. In order to obtain better adhesion of the active substances on the carriers, known adhesives, such as glue, casein, alginic acid salts and the like may be employed.

It is also possible, for example, to mix the triazine compounds, if it be desired, with carriers, with suspending agents and stabilizers to produce a paste or powder which then can be mixed with water to form a suspension.

Known anionic, cationic or nonionic substances can be employed as wetting agents, emulsifiers and stabilizers, such as, for instance, turkey red oil, fatty acid salts, alkyl aryl sulfonates, secondary alkyl sulfates, resin acid salts, polyoxyethylene ethers of fatty alcohols, fatty acids or fatty amines, quaternary ammonium compounds, lignin sulfonic acid, saponin, gelatine, casein, either alone or in admixture.

The following examples will illustrate representative preparations of compounds according to the invention, active compounds containing the same and their application.

EXAMPLE 1

2-chloro-4-amino-6-(1-cyano-1-methyl-ethyl)-amino triazine.

184.5 g. of cyanuric chloride was suspended in 750 ml. of acetone and the suspension cooled to 0° C.; then 85.7 g. of alpha-amino isobutyronitrile (1.02 mol) were added gradually while maintaining a temperature not above 5° C. Thereafter, a solution of 40 g. NaOH in 100 ml. of $H_2O$ was added gradually, care being taken that the pH did not exceed 8. Then 200 g. of a 17 percent ammonia solution was added gradually without external cooling. The temperature gradually rose to 30°–35° C. The mixture was stirred until it reacted neutrally. The acetone was then drawn off under vacuum and water added to the residue. The resulting thick crystal paste was filtered off, washed with water, and dried under vacuum at 50° C.
Yield: 174.4 g. (82 percent of theory)
Thin layer chromatogram: 98 percent
Analysis

|  |  | C | H | N | Cl |
|---|---|---|---|---|---|
| $C_7H_9N_6Cl$ | calculated % | 39.5 | 4.3 | 39.5 | 16.7 |
| mo. wt. 212.5 | found % | 39.7 | 4.4 | 39.5 | 16.6 |

EXAMPLE 2

2-chloro-4-ethylamino-6-(1-cyano-1-methyl-propyl)-amino-triazine.

184.5 g. of cyanuric chloride was suspended in 1 liter of tetrahydrofuran and the suspension cooled to 0° C. While maintaining this temperature and stirring, 100 g. of alpha-aminoisovaleronitrile were first added gradually and then 80 g. of 50 percent aqueous NaOH added gradually. The mixture quickly became neutral. The cooling was suspended and 90 g. of a 50 percent aqueous ethylamine solution was added, permitting the temperature to rise, and then again 80 g. of 50 percent aqueous NaOH gradually added thereto. The maximum temperature reached was 45° C. After processing analogously to example 1, 240.5 g. of a snow-white product of a melting point of 139° to 141° C. was obtained.
Analysis:

|  |  | C | H | N | Cl |
|---|---|---|---|---|---|
| $C_{10}H_{15}N_6Cl$ | calculated % | 47.2 | 5.9 | 33 | 13.9 |
| mol. wt. 254 | found % | 47.2 | 6 | 33.1 | 14.1 |

2-ethylamino-4-(1-cyano-ethyl)-amino-6-chloro-s-triazine of a melting point of 174° to 175° C. was produced analogously from cyanuric chloride, alpha-alaninenitrile and ethylamine.

EXAMPLE 3

2-methoxy-4-ethylamino-6-(1-cyano-1-methyl-ethyl)-amino-triazine.

240.5 g. of 2-chloro-4-ethylamino-6-(1-cyano-1-methylethyl)-amino-triazine was added to 1 liter of methanol containing 54 g. of sodium methylate at 30°–35° C. The reaction was weakly exothermic. The reaction mixture was kept at 30°–35 C. for 4 hours and then at 60° C. for 1 hour. The solution then reacted neutral. The methanol was evaporated off under vacuum and the residue taken up in water and the crystals formed filtered off, washed with water and dried.
Yield: 227 g. Melting a point: 138° C.
Analysis:

|  |  | C | H | N |
|---|---|---|---|---|
| $C_{10}H_{16}N_6O$ | calculated % | 50.8 | 6.8 | 35.6 |
| mol. wt. 236 | found % | 50.7 | 6.9 | 35.7 |

2-ethylamino-4-(1-cyano)-ethyl-6-methoxy-s-triazine of a melting point of 94°–95° C. was prepared analogously from the corresponding -6-chloro compound.

EXAMPLE 4

2-methylmercapto-4-β-cyanoethylamino-6-(1-cyano-1-methyl-propyl)-amino-triazine.

279.5 g. of 2-chloro-4-β-cyanoethylamino-6-(1-cyano-1-methyl-propyl)-amino-triazine were added to a solution of 70 g. of sodium methylmercaptide in 1 liter of methanol and the mixture heated for 12 hours at 40°–45° C. The reaction mixture was boiled down under vacuum and the residue taken up in water. After filtering off, washing and drying, the resulting crystals, 284 g. of a white crystalline powder of a melting point of 110°–112° C. was obtained.
Analysis:

|  |  | C | H | N | Cl |
|---|---|---|---|---|---|
| $C_{12}H_{17}N_7S$ | calculated % | 49.5 | 5.8 | 33.7 | 11.0 |
| mol. wt. 291 | found % | 49.7 | 5.8 | 33.6 | 11.0 |

2-ethylamino-4-(1-cyano-ethyl)-6-methyl-mercapto-s-triazine of a melting point of 79°–81° C. was prepared analogously from the corresponding 6-chloro compound.

EXAMPLE 5

2-azido-4-methylamino-6-(1-cyano-1methyl-hexyl)-amino-triazine.

282.5 g. of 2-chloro-4-methylamino-6-(1-cyano-1-methyl-hexyl)-amino-triazine were added to 1 liter of isopropanol and 70 g. of sodium azide and 100 ml. of an aqueous solution of 20 g. of trimethylamine added thereto. The temperature rose slightly. The mixture was then heated for 4 hours at 40°–45° C. The solvent was then evaporated off under vacuum and the residue take up in water. After filtering off the resulting crystals, washing and drying, 267.5 g. of white crystals of a melting point of 97°–98° C. were obtained.
Analysis:

|  |  | C | H | N |
|---|---|---|---|---|
| $C_{12}H_{19}N_9$ | calculated % | 49.8 | 6.6 | 43.6 |
| mol. wt. 289 | found % | 49.7 | 6.8 | 43.3 |

2-ethylamino-4-(1-cyano-ethyl)-amino-6-amino-triazine, of a melting point of 91–92° C. was prepared analogously from the corresponding 6-chloro compound.

EXAMPLE 6

2-isopropylamino-4-ethylamino-6-(1-cyano-1-methyl-ethyl)-anino-triazine.

An aqueous solution of 120 g. of isopropylamine in 600 ml. of $H_2O$ was placed in a 2-liter autoclave and 240.5 g. of 2-chloro-4-ethylamino-6-(1-cyano-1-methyl-ethyl)-amino-triazine added thereto. After closing the autoclave it was heated to 100°–110° C. for 4 hours. After processing the reaction mixture in a manner analogous to that of the preceding examples, 253 grams of a white crystalline product of a melting point of 91°–92° C. were obtained:

Analysis:

|  |  | C | H | N |
|---|---|---|---|---|
| $C_{11}H_{21}N_7$ | calculated % | 54.8 | 8.0 | 37.2 |
| mol. wt. 263 | found % | 54.6 | 8.2 | 37.1 |

EXAMPLE 7

2-propylmercapto-4-ethylamino-6-(1-cyano-1-methyl-propyl)-amino-triazine.

224 g. of 2-propylmercapto-4,6-dichlorotriazane was dissolved in 500 ml. of acetone and 98 g. of α-amino-isovaleronitrile added slowly while cooling to 10° to 15° C. and then a solution of 40 g. of NaOH in 100 ml. of $H_2O$. The pH of the solution was between 7 and 8. Then 90 g. of a 50 percent ethylamine solution and 100 g. of 40 percent NaOH in $H_2O$ were added. The mixture was heated under a reflux condenser to 60° C. while stirring for 3 hours. The solvent was distilled off and the residue taken up in water. A thick crystal paste formed which was further washed and dried. Yield 282.5 g. corresponding to 96.3 percent of theory, melting point 71°–72° C.

Analysis:

|  |  | C | H | N | S |
|---|---|---|---|---|---|
| $C_{13}H_{23}N_5S$ | calculated % | 53.1 | 7.5 | 28.6 | 10.9 |
| mol. wt. 294 | found % | 52.8 | 7.2 | 28.8 | 10.6 |

EXAMPLE 8

2-ethylmercapto-4-ethylamino-6-(1-cyano-1-methl-ethyl)-amino-triazine.

21 g. of 2-ethylmercapto-4,6-dichlorotriazine was introduced into 100 ml. of acetone and 8.3 g. of α-amino-isobutyronitrile slowly added to such solution. Subsequently a solution of 4 g. of NaOH in 15 ml. of $H_2O$ were added slowly. The temperature was 20° C. Then 9.1 g. of a 50 percent solution of ethylamine were added at 40° C. and subsequently 4 g. of NaOH in ml. of $H_2O$. The solution was then heated under reflux for 4 hours It reacted neutral at the end. The acetone was removed under vacuum and the residue taken up in water. Crystallization was completed in a short period of time. 24 g. of white crystals of a melting point of 126°–127° C. of a 91.2 percent yield was obtained.

EXAMPLE 9

2-chloro-4-methylamino-6-(1-cyano-cyclohexyl)-amino-triazine.

184.5 g. of cyanuric chloride were dissolved in 1 liter of tetrahydrofuran. The solution was cooled down to 0° C. and 124 g. of 1-cyanocyclohexylamine dissolved in 250 ml. of tetrahydrofuran added slowly thereto. Thereafter, a solution of 40 g. of NaOH in 200 ml. of water was also slowly added. The mixture quickly became neutral. Then 180 g. of 50 percent ethylamine solution was added all at once. The temperature rose from 0° C. to 45° C. After 10 minutes the reaction of the solution was neutral. The tetrahydrofuran was then distilled off under vacuum and the residue was taken up in water. The crystals which formed were filtered off, washed and dried. The yield of white crystals was 247 g. of 92.7 percent of theory. Their melting point was 183°–184° C.

EXAMPLE 10

136.5 g. of acetone were placed in a 3-liter round flask and cooled to 5° C. Then 5 ml. of triethylamine was added and subsequently 650 g. of liquid hydrogen cyanide was gradually added from a cooled supply. The reaction was exothermic. After completion of the reaction the pH of the solution was adjusted to 2 with 50 percent phosphoric acid.

An autoclave was filled with 1,800 ml. of liquid ammonia and after closing the acetone cyanhydrin was pumped in. The temperature rose to 40° C. and the mixture was subsequently heated to 50° C. for 3 hours. After cooling down the contents of the autoclave were removed. The crude product was a light-yellow liquid. It was rendered water-free by treating it three times with solid KOH and then fractionally distilled under vacuum in a 1 column with a dephlegmator. At 48°–50° C. under a pressure of 13 mm. Hg colorless alpha-aminoisobutyronitrile distilled over in a quantity of 1,756 g. (88.8 percent of theoretical yield).

The following alpha-aminonitriles

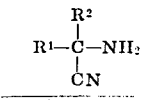

were analogously prepared by this method:

| R¹ | R² | Boiling point |
|---|---|---|
| $CH_3$ | $C_2H_5$ | 60–61° C./12 mm. Hg. |
| $CH_3$ | $C_3H_7$-n | 74–75° C./18 mm. Hg. |
| $C_2H_5$ | $C_2H_5$ | 65° C./12 mm. Hg. |
| $CH_3$ | $C_4H_9$-i | 71° C./12 mm. Hg. |
| $C_2H_5$ | $C_3H_7$-n | 73–75° C./18 mm. Hg. |
| $CH_3$ | $C_5H_{11}$-n | 90° C./15 mm. Hg. |
| $CH_3$ | $C_5H_{11}$-i | 95° C./20 mm. Hg. |
| $C_3H_7$-n | $C_3H_7$-n | 78–80° C./12 mm. Hg. |

$$C\begin{array}{c}CH_2-CH_2\\ \\CH_2-CH_2\end{array}\quad 91\text{–}93°\text{ C./12 mm. Hg.}$$

$$C\begin{array}{c}CH_2-CH_2\\ \\CH_2-CH_2\end{array}CH_2\quad 101°\text{ C./12 mm. Hg.}$$

EXAMPLE 11

64.2 g. (1.2 mol) of ammonium chloride was dissolved in 200 ml. of water and then 78 g. of potassium cyanide slowly was added thereto while being stirred and cooled. Thereafter, 86 g. of methyl isopropyl ketone (1 mol) was slowly added to the mixture at 15°–20° C. and the mixture stirred for 2 hours at this temperature. Subsequently ammonia gas was passed through the mixture while stirring for 2 hours, the temperature being slowly raised to 50° C. After cooling down the mixture was placed in a separatory funnel and shaken out three times with ether. The ether extracts were united and dried with $Na_2SO_4$ and the solvent distilled off under vacuum. The residue was distilled over a small column under vacuum. The desired 1-methyl-1-cyano-2-methyl-n-butylamine distilled over at 60°–61° C. at a pressure of 12 mm. Hg as a water white liquid. The yield was 86 g. or 76.7 percent of the theoretical yield.

The remaining novel cyanoalkylamino triazines according to the invention shown in the table preceding the examples, as well as in the following examples, were prepared by methods analogous to those described in the above examples employing the appropriate amine, ammonia, azide, alcoholate, alkyl mercaptide, cyanoalkylamine and halo-s-triazine as starting material. In the following "parts" signify parts by weight.

EXAMPLE 12

10 parts of 2-methylamino-4-(1-cyano-1-methyl-ethyl)-amino-6-chloro-triazine, 89 parts of bentonite, 1 part of finely divided pyrogenic silica, were together ground in a ball mill to a fine dust. The mixture could be applied as a dust.

EXAMPLE 13

A mixture of 10 parts of 2-ethylamino-4-(1-cyano-1-methyl-n-propyl)-amino-6-methoxy-triazine and 90 parts of kieselguhr were ground together to produce a dust of extreme fineness suitable for application as a dust.

EXAMPLE 14

A mixture of 20 parts of 2-isopropylamino-4-(1-cyano-1-methyl-ethyl)6-methylmercapto-triazine, 70 parts of chlorobenzene and 10 parts of an octylphenyl polyglycol ether produced from di-t-butyl phenol and about 10–12 mol of ethylene oxide (Hostapal CV) was prepared. This mixture provided a stable dispersion upon admixture with water.

EXAMPLE 15

25 parts of 2-isopropylamino-4-(1-cyano-1-methylethyl)-amino-6-chlorotriazine was dissolved in 150 parts of cyclohexanone, 15 parts of xylene and 10 parts of a substituted naphthalene disulfonic acid such as Nekal BX. This mixture provided a stable emulsion upon admixture with water.

EXAMPLE 16

50 parts of 2-ethylamino-4-(1-cyano-1-methylethyl)-amino-6-azido-triazine were dissolved in 450 parts of kerosene. The solution can be used directly for spray applications.

EXAMPLE 17

10 parts of 2-methylamino-4-(1-cyano-ethyl)-amino-6-chloro-s-triazine, 89 parts of bentonite and 1 part of finely divided silica were ground in a ball mill to a dust of extreme fineness. The mixture is suitable for application as a dust.

EXAMPLE 18

A mixture of 10 parts of 2-ethylamino-4-(1-cyano-propyl)-amino-6-methoxy-s-triazine and 90 parts of kieselguhr was similarly ground in a ball mill to a dust of extreme fineness to provide a mixture suitable for application as a dust.

EXAMPLE 19

A mixture of 20 parts of 2-isopropyl-amino-4-(1-cyano-ethyl)-amino-6-methyl-mercapto triazine, 70 parts of chlorobenzene and 10 parts of an octyl phenyl polyglycol ether (Hostapal CV, produced from di-t-butyl phenol and 10–12 mol of ethylene oxide). This preparation upon mixture with water gives a stable dispersion.

25 parts of 2-isopropyl-amino-4-(1-cyano-propyl)-amino-6-chloro-s-triazine were dissolved in 150 parts of cyclohexanone, 15 parts of chlorobenzene and 10 parts of a substituted naphthalene disulfonic acid, such as Nekal BX. The mixture upon admixture with water gives a stable emulsion.

EXAMPLE 21

50 parts of 2-ethylamino-4-(1-cyano-ethyl)-amino-6-azido-s-triazine were dissolved in 450 parts of kerosene. The mixture can be sprayed directly.

EXAMPLE 22

The following tests were carried out to investigate the herbicidal activity of compounds according to the invention:
a. Preemergence soil treatment after seeding:

Various seeds were sown in soil in plastic dishes in a greenhouse maintained at 21° C. watered in the morning and in the afternoon, treated with a dispersion obtained by pouring a solution of the herbicide in equal quantities of water. Thereafter, the sprouting of the plants was observed with normal watering and after 2 weeks it was determined whether and The seeds were sown and maintained in a greenhouse in the same manner as under (a) except that the application of the herbicide to the soil was effected after sprouting. After 2 it was determined if and to what extent the plant growth had been reduced.

c. Leaf treatment:

The procedure as described under (b) was followed except that the herbicide was applied to the plant leaves rather than the soil.

The results of the tests are given in the following tables. The growth was evaluated according to a scale ranging from 0 to 9 in which 0 signifies normal growth and 9 total destruction of the plant.

The active substance concentration in the tests under (a) corresponded to 20 kg./hectare and in tests under (b) and (c) to 10 kg./hectare and 1 kg./hectare, using the following compounds:

I  2-amino-4-(1-methyl-1-cyano-ethyl)-amino-6-chloro-triazine
II  2-methylamino-4-(1-methyl-1-cyano-ethyl-amino-6-chloro-triazine
III  2-ethylamino-4-(1-methyl-1-cyano-ethyl)-amino-6-chloro-triazine
IV  2-ethylamino-4-(1-methyl-1-cyano-n-propyl)-amino-6-chloro-triazine
V  2-methylamino-4-(1-methyl-1-cyano-ethyl)-amino-6-azido-triazine
VI  2-ethylamino-4-(1-methyl-1-cyano-ethyl)-amino-6-azido-triazine
VII  2-ethylamino-4-(1-methyl-1-cyano-ethyl)-amino-6-methylmercapto-triazine
VIII  2,4-bis-ethylamino-6-chloro-triazine
IX  2-ethylamino-4-isopropylamino-6-chloro-triazine
X  2-ethylamino-4-t-butylamino-6-methylmercapto-triazine

TABLE [Test a]

| Substance used | Corn | Oats | Rye grass | Peas | Linseed | Mustard | Sugar beets |
|---|---|---|---|---|---|---|---|
| I | 4 | 9 | 8 | 6 | 9 | 9 | 9 |
| II | 0 | 8 | 8 | 6 | 9 | 9 | 9 |
| III | 0 | 8 | 8 | 5 | 9 | 9 | 9 |
| IV | 0 | 8 | 8 | 5 | 9 | 9 | 9 |
| V | 4 | 8 | 8 | 4 | 9 | 9 | 9 |
| VI | 4 | 7 | 7 | 4 | 9 | 9 | 9 |
| VII | 6 | 9 | 9 | 7 | 9 | 9 | 9 |
| Comparison. | | | | | | | |
| VIII | 0 | 6 | 7 | 5 | 9 | 9 | 9 |
| IX | 0 | 7 | 8 | 5 | 9 | 9 | 9 |
| X | 3 | 7 | 8 | 4 | 9 | 9 | 9 |

TABLE [Test b]

| Substance used | Kg./hectare | Corn | Oats | Rye grass | Peas | Linseed | Mustard | Sugar beet |
|---|---|---|---|---|---|---|---|---|
| I | 10 | 4 | 9 | 8 | 7 | 9 | 9 | 9 |
|   | 1 | 0 | 8 | 4 | 6 | 9 | 9 | 8 |
| II | 10 | 0 | 8 | 5 | 3 | 9 | 9 | 9 |
|   | 1 | 0 | 8 | 4 | 2 | 9 | 9 | 9 |
| III | 10 | 1 | 9 | 9 | 5 | 9 | 9 | 9 |
|   | 1 | 0 | 8 | 7 | 5 | 9 | 9 | 9 |
| IV | 10 | 0 | 8 | 8 | 5 | 9 | 9 | 9 |
|   | 1 | 0 | 7 | 6 | 3 | 9 | 9 | 9 |
| V | 10 | 2 | 8 | 8 | 4 | 9 | 9 | 9 |
|   | 1 | 0 | 7 | 4 | 0 | 9 | 9 | 9 |
| VI | 10 | 2 | 8 | 8 | 3 | 9 | 9 | 9 |
|   | 1 | 1 | 8 | 7 | 1 | 9 | 9 | 9 |
| VII | 10 | 6 | 9 | 9 | 6 | 9 | 9 | 9 |
|   | 1 | 4 | 9 | 8 | 6 | 9 | 9 | 9 |
| Comparison: | | | | | | | | |
| VIII | 10 | 3 | 6 | 4 | 5 | 6 | 9 | 8 |
|   | 1 | 0 | 3 | 2 | 4 | 3 | 7 | 6 |
| IX | 10 | 1 | 6 | 6 | 5 | 9 | 9 | 9 |
|   | 1 | 0 | 5 | 5 | 5 | 8 | 9 | 9 |
| X | 10 | 3 | 8 | 9 | 6 | 9 | 9 | 9 |
|   | 1 | 2 | 7 | 8 | 6 | 9 | 9 | 9 |

TABLE [Test c]

| Substance used | Kg./hectare | Corn | Oats | Rye grass | Peas | Linseed | Mustard | Sugar beet |
|---|---|---|---|---|---|---|---|---|
| I | 10 | 2 | 8 | 9 | 1 | 9 | 9 | 9 |
|   | 1 | 0 | 6 | 4 | 0 | 6 | 6 | 8 |
| II | 10 | 0 | 8 | 8 | 3 | 9 | 9 | 9 |
|   | 1 | 0 | 5 | 4 | 0 | 7 | 8 | 7 |

| | | | | | | | | |
|---|---|---|---|---|---|---|---|---|
| IV | 10 | 0 | 7 | 8 | 1 | 8 | 9 | 9 |
|    | 1  | 0 | 3 | 3 | 0 | 8 | 9 | 8 |
| V  | 10 | 4 | 7 | 9 | 3 | 9 | 9 | 9 |
|    | 1  | 0 | 1 | 1 | 1 | 8 | 9 | 1 |
| VI | 10 | 4 | 7 | 9 | 2 | 8 | 9 | 9 |
|    | 1  | 0 | 4 | 4 | 0 | 7 | 9 | 3 |
| VII| 10 | 6 | 8 | 9 | 9 | 9 | 9 | 9 |
|    | 1  | 1 | 4 | 2 | 0 | 7 | 7 | 9 |
| Comparison: | | | | | | | | |
| VIII | 10 | 0 | 4 | 6 | 1 | 6 | 8 | 7 |
|      | 1  | 0 | 2 | 4 | 0 | 4 | 6 | 7 |
| IX   | 10 | 1 | 5 | 7 | 3 | 8 | 9 | 7 |
|      | 1  | 0 | 3 | 5 | 2 | 5 | 8 | 6 |
| X    | 10 | 3 | 7 | 8 | 3 | 9 | 9 | 9 |
|      | 1  | 0 | 4 | 4 | 0 | 9 | 9 | 8 |

EXAMPLE 23

Oats, mustard and linseed were sown in seed pans filled with earth. After the plants had reached a height of 8 cm. they were treated with an 0.5 percent emulsion of 2-ethylamino-4-(1-cyano-1-methyl-ethyl)-amino-6-methoxy-triazine. After 18 days all plants were destroyed.

EXAMPLE 24

The following further tests were carried out to investigate the herbicidal efficiencies of the compounds according to the invention:

a. Preemergence soil treatment after seeding:

Seeds of test plants were sown in narrow strips in plastic flats (38×13×6 cm.) filled with John Innes potting compost. The seeding, watering and spraying with the herbicidal agent occurred on the same day. Various concentrations of the active substances were used and the phytotoxicity ascertained by visual inspection after about 14 days. The evaluation of the tests was upon the basis of a scale ranging from 0 to 9 in which 0 signifies normal growth and 9 total destruction of the plant. The phytotoxicity for each type of plant was converted to percent and plotted against the concentration of the active substance and the $PD^{50}$ determined therefrom, that is, the active substance concentration providing a 50 percent reduction of the plant growth.

b. Post-emergence treatment:

The seeds were sown in plastic plates 9 cm. in diameter. After sprouting the plants were sprayed with the herbicidal agent at various concentrations. After 10 days the phytotoxicity and $PD^{50}$ were determined as under (a).

When agropyron repens was used as the test plant, the sprouts were cut off at the surface of the soil and the further growth after 3 further weeks determined The $PD^{50}$ values for the various plant vertices tested are given in the following tables I (according to a) and II (according to b).

The compounds according to the invention tested were of the formula

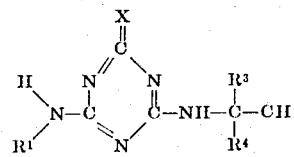

wherein $R^1$, $R^3$, $R^4$ and X have the significance indicated in the tables for the compounds tested.

In comparative tests 7a, 12 and 18, the group indicated under $R^3$ and $R^4$ replaces the group

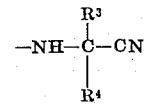

in the compounds according to the invention.

TABLE I
[Test a]

| Test No. | X | $R^1$ | $R^3$ | $R^4$ | Corn | Wheat | Barley | Rice | Finger grass | Fox tail |
|---|---|---|---|---|---|---|---|---|---|---|
| 1 | Cl | $C_2H_5$ | $CH_3-$ | $CH_3-$ | >5 | 0.21 | 0.16 | >0.1 | >0.1 | >0.1 |
| 2 | $N_3$ | $C_2H_5$ | $CH_3-$ | $C_2H_5-$ | >5 | 2.6 | 3.6 | 2.2 | 1.6 | 1.2 |
| 3 | $-SCH_3$ | $C_2H_5-$ | $CH_3-$ | $CH_3-$ | 1.2 | 0.21 | 0.22 | (¹) | <0.1 | <0.1 |
| 4 | $-OCH_3$ | $C_2H_5-$ | $CH_3-$ | $CH_3-$ | 0.26 | <0.1 | <0.1 | (¹) | <0.1 | <0.1 |
| 5 | Cl | H | $CH_3-$ | $CH_3-$ | >5 | 0.84 | 0.23 | (¹) | <0.1 | <0.1 |
| 6 | Cl | $CH_3-$ | ⟨H⟩ | | >5 | 1.7 | >2 | 1.3 | (¹) | (¹) |
| 7 | Cl | $-(CH_2)_3OCH_3$ | $CH_3-$ | $CH_3-$ | >5 | 0.29 | 0.29 | (¹) | 0.29 | <0.1 |
| 7a | Cl | $C_2H_5$ | (NHC$_3$H$_7$-i²) | | >5 | 0.82 | 1.1 | (¹) | 0.6 | (¹) |

| Test No. | Barnyard grass³ | Cotton | Sugar beet | Cabbage | Plantain | Chicory | Knot grass | Mayweed | Clover | Chenopodium album |
|---|---|---|---|---|---|---|---|---|---|---|
| 1 | (¹) | 0.42 | <0.1 | <0.1 | <0.1 | <0.1 | <0.1 | <0.1 | (¹) | (¹) |
| 2 | (¹) | >5 | 1.0 | 0.50 | 0.80 | 0.95 | <0.1 | 0.39 | <0.1 | (¹) |
| 3 | <0.1 | >5 | <0.1 | <0.1 | 0.16 | <0.1 | <0.1 | (¹) | <0.1 | <0.1 |
| 4 | <0.1 | 1.3 | <0.1 | <0.1 | <0.1 | <0.1 | <0.1 | (¹) | <0.1 | <0.1 |
| 5 | 0.19 | 0.79 | <0.1 | 0.5 | <0.1 | <0.1 | <0.1 | (¹) | <0.1 | <0.1 |
| 6 | >1.6 | >5 | 0.5 | 0.42 | 0.21 | 0.22 | 0.55 | (¹) | 0.18 | (¹) |
| 7 | 0.22 | 4.7 | 0.23 | <0.1 | 0.16 | 0.18 | <0.1 | (¹) | <0.1 | 0.12 |
| 7a | 0.56 | >5 | 0.35 | (¹) | <0.2 | <0.2 | <0.2 | (¹) | (¹) | (¹) |

¹ Not tested.  ² Comparison.  ³ *Echinochloa crusgalli.*

TABLE II
[Test b]

| Test No. | X | $R^1$ | $R^3$ | $R^4$ | Corn | Wheat | Barley | Rice | Finger grass | Foxtail |
|---|---|---|---|---|---|---|---|---|---|---|
| 8  | Cl | $C_2H_5-$ | $CH_3-$ | $CH_3-$ | 0.76 | 0.18 | <0.1 | 0.22 | 0.68 | <0.1 |
| 9  | $N_3$ | $C_2H_5-$ | $CH_3-$ | $C_2H_5-$ | 1.8 | 0.62 | 0.52 | 0.65 | 0.80 | 0.37 |
| 10 | $-SCH_3$ | $C_2H_5-$ | $CH_3-$ | $CH_3-$ | 0.95 | 0.20 | <0.1 | 0.25 | 0.15 | <0.1 |
| 11 | $-OCH_3$ | $C_2H_5$ | $CH_3-$ | $CH_3-$ | 0.7 | <0.1 | <0.1 | (¹) | 0.16 | <0.1 |
| 12 | Cl | $C_2H_5-$ | ($CH_2)_2CN^2$ | | >5 | 2.7 | 1.1 | 3.6 | >5 | 1.7 |
| 13 | Cl | H | $CH_3-$ | $CH_3$ | >5 | 0.48 | 0.27 | 0.58 | 0.90 | 0.34 |
| 14 | $-OCH_3$ | H | $CH_3-$ | $CH_3-$ | 0.19 | 0.11 | (¹) | 0.1 | (¹) | (¹) |
| 15 | Cl- | $CH_3-$ | ⟨H⟩ | | >5 | 0.58 | 0.41 | >>5 | 4.3 | 0.09 |
| 16 | Cl- | $-(CH_2)_3OCH_3$ | $CH_3$ | $CH_3$ | >5 | 0.34 | 0.13 | 0.58 | 0.27 | <0.1 |
| 17 | $CH_3O-$ | $-(CH_2)_3OCH_3$ | $CH_3$ | $CH_3$ | 0.17 | 0.07 | (¹) | 0.26 | (¹) | (¹) |
| 18 | Cl | $C_2H_5$ | NHC$_3$H$_7$-i² | | >5 | 0.1 | 0.3 | (¹) | 0.45 | (¹) |

| Test No. | Barnyard grass[3] | Rye grass | Agropyron repens | Agropyron repens regrowth | Cotton | Sugar beet | Cabbage | Carrots |
|---|---|---|---|---|---|---|---|---|
| 8 | (¹) | 0.12 | 0.21 | <0.1 | <0.1 | <0.1 | <0.1 | <0.1 |
| 9 | (¹) | 0.26 | 0.52 | 2.3 | 0.19 | 0.11 | <0.1 | 0.14 |
| 10 | 0.14 | (¹) | <0.1 | 0.10 | <0.1 | <0.1 | <0.1 | <0.1 |
| 11 | 0.11 | 0.1 | 0.13 | 0.11 | <0.1 | <0.1 | <0.1 | <0.1 |
| 12 | (¹) | 2.9 | >>5 | 1.2 | 4.2 | 0.54 | 1.4 | 3.2 |
| 13 | 0.58 | (¹) | 0.37 | (¹) | <0.1 | <0.1 | 0.30 | 0.12 |
| 14 | 0.02 | 0.1 | (¹) | (¹) | <0.02 | (¹) | <0.02 | (¹) |
| 15 | 3.6 | (¹) | 4.1 | 0.27 | 0.59 | <0.06 | 0.08 | 0.62 |
| 16 | 0.28 | (¹) | 0.16 | 0.17 | <0.1 | <0.1 | <0.1 | <0.1 |
| 17 | 0.06 | 0.07 | (¹) | (¹) | 0.02 | (¹) | 0.02 | (¹) |
| 18 | 0.1 | 0.36 | 2.4 | (¹) | 0.25 | 0.08 | 0.08 | 0.35 |

| Test No. | Plantain | Chicory | Knot grass | Chenopodium album | Linseed | Mustard |
|---|---|---|---|---|---|---|
| 8 | <0.1 | 0.12 | 0.23 | (¹) | (¹) | (¹) |
| 9 | 0.19 | 0.18 | 0.18 | (¹) | <0.1 | (¹) |
| 10 | <0.1 | <0.1 | <0.1 | (¹) | <0.1 | (¹) |
| 11 | <0.1 | <0.1 | <0.1 | <0.1 | (¹) | (¹) |
| 12 | >5 | >5 | >5 | (¹) | (¹) | (¹) |
| 13 | 0.17 | 0.18 | 0.15 | (¹) | <0.1 | (¹) |
| 14 | 0.06 | 0.05 | (¹) | (¹) | (¹) | <0.01 |
| 15 | 0.09 | 0.08 | <0.06 | <0.06 | (¹) | (¹) |
| 16 | <0.1 | 0.15 | <0.1 | (¹) | <0.1 | (¹) |
| 17 | 0.04 | 0.04 | (¹) | (¹) | (¹) | 0.01 |
| 18 | 0.13 | 0.17 | (¹) | 0.08 | (¹) | (¹) |

¹ Not tested.   ² Comparison.   ³ *Echinochloa causgalli*.

EXAMPLE 25

Tests were carried out to investigate the herbicidal efficiency of compounds according to the invention in the form of solutions or suspensions in a mixture of equal parts of water and acetone which in addition contained 1 percent of a normal commercial dispersing agent and 2 percent of glycerine. The following plant varieties were used in the tests: corn, wheat, rye grass, peas, linseed, mustard and sugar beet.

The application in one series was to the leaves of the plant varieties tested and in the other series to the soil as a preemergence application.

In the leaf treatment the formulation of the compounds was sprayed on the leaves of the plants with the aid of a spray at a dosage rate of 1 kg./hectare.

In the soil treatment the seeds of the plant varieties tested were sown in earth in plastic dishes and watered shortly before application of the formulation tested and also simultaneously with the leaf treatment so that equal quantities of the active substance were used.

At the end of the test periods (7 days in the leaf treatment and 11 days in the preemergence soil treatment) the results were determined by visual inspection. The evaluation was upon the basis of a scale ranging from 0 to 9 in which 0 signifies normal growth and 9 total destruction. The average phytotoxicity with all seven plant varieties was tested with an active substance application rate of 1 kg./hectare. Tables 1–5 concern compounds according to the invention which are identified according to their substituents X and $R^1$–$R^4$ as in the tables in example 19. Table 6 concerns previously known s-triazine compounds which are also identified according to their substituents.

TABLE 1
[X=Cl; $R^1$=H]

| $R^2$ | $R^3$ | $R^4$ | Leaf treatment | Pre-emergence soil treatment |
|---|---|---|---|---|
| H | CH₃ | CH₃ | 6.3 | 4.3 |
| CH₃ | CH₃ | CH₃ | 5.9 | 4.4 |
| C₂H₅ | CH₃ | CH₃ | 6.9 | 4.6 |
| C₃H₇-i | CH₃ | CH₃ | 7.1 | 6.0 |
| CH₃ | CH₃ | C₂H₅ | 7.0 | 5.0 |
| C₂H₅ | CH₃ | C₂H₅ | 6.1 | 4.4 |
| C₃H₇-i | CH₃ | C₂H₅ | 6.7 | 4.6 |
| CH₃ | CH₃ | C₃H₇-n | 7.3 | 4.3 |
| C₂H₅ | CH₃ | C₃H₇-n | 6.9 | 3.6 |
| H | CH₃ | C₃H₇-i | 7.0 | 4.3 |
| CH₃ | CH₃ | C₃H₇-i | 4.6 | 5.3 |
| CH₃ | CH₃ | C₃H₇-i | 7.0 | 3.7 |
| C₂H₅ | CH₃ | C₃H₇-i | 7.1 | 3.1 |
| C₂H₅ | CH₃ | C₃H₇-i | 7.1 | 3.1 |
| C₃H₇-i | CH₃ | C₃H₇-i | 7.0 | 3.9 |
| C₂H₅ | C₂H₅ | C₂H₅ | 5.6 | 4.1 |
| C₃H₇-i | C₂H₅ | C₂H₅ | 6.9 | 3.2 |
| CH₃ | CH₃ | C₄H₉-i | 5.7 | 2.7 |
| C₂H₅ | CH₃ | C₄H₉-i | 5.6 | 2.4 |
| CH₃ | CH₃ | C₅H₁₁-n | 6.6 | 0.7 |
| C₂H₅ | CH₃ | C₅H₁₁-n | 6.0 | 2.7 |
| C₃H₇-i | CH₃ | C₅H₁₁-n | 6.6 | 1.4 |
| CH₃ | CH₃ | C₅H₁₁-n | 6.9 | 2.3 |
| C₂H₅ | CH₃ | C₅H₁₁-n | 6.6 | 2.0 |
| C₃H₇-i | CH₃ | C₅H₁₁-n | 6.1 | 1.1 |
| (CH₂)₃OCH₃ | CH₃ | CH₃ | 6.1 | 1.9 |
| (CH₂)₃OCH₃ | CH₃ | C₂H₅ | 5.9 | 2.3 |
| (CH₂)₃OCH₃ | CH₃ | C₃H₇-n | 6.9 | 2.3 |
| (CH₂)₃OCH₃ | C₂H₅ | C₂H₅ | 6.4 | 1.9 |
| (CH₂)₃OC₂H₅ | CH₃ | CH₃ | 6.3 | 2.4 |
| OCH₃ | CH₃ | CH₃ | 6.4 | 1.1 |
| OC₂H₅ | CH₃ | CH₃ | 6.4 | 1.1 |

| $R^2$ | $R^3$ | $R^4$ | Leaf treatment | Pre-emergence soil treatment |
|---|---|---|---|---|
| C₂H₅ | —NH–⬡–H (NC) | | 6.0 | 3.7 |
| C₂H₅ | —NH–⬡–H (NC) | | 6.1 | 3.4 |
| C₂H₅ | H | CH₃ | 6.9 | 5.9 |
| C₃H₇-i | H | CH₃ | 6.6 | 4.7 |
| C₂H₅ | H | C₂H₅ | 6.9 | 5.6 |
| C₂H₅ | H | C₃H₇-n | 7.4 | 4.3 |
| CH₃ | H | C₃H₇-i | 7.0 | 4.0 |
| C₂H₅ | H | C₃H₇-i | 6.7 | 3.1 |
| C₃H₇-i | H | C₃H₇-i | 7.3 | 3.0 |

TABLE 2
[X=N₃; $R^1$=H]

| $R^2$ | $R^3$ | $R^4$ | Leaf treatment | Pre-emergence soil treatment |
|---|---|---|---|---|
| H | CH₃ | CH₃ | 7.6 | 3.3 |
| C₂H₅ | CH₃ | CH₃ | 6.3 | 3.9 |
| H | CH₃ | C₂H₅ | 7.9 | 3.4 |
| CH₃ | CH₃ | C₂H₅ | 6.0 | 1.9 |
| C₂H₅ | CH₃ | C₂H₅ | 5.9 | 3.4 |
| H | CH₃ | C₃H₇-i | 6.1 | 2.9 |
| CH₃ | CH₃ | C₃H₇-i | 6.9 | 3.7 |
| C₂H₅ | CH₃ | C₃H₇-i | 7.3 | 0 |
| C₃H₇-i | CH₃ | C₃H₇-i | 7.0 | 1.3 |
| CH₃ | CH₃ | C₄H₉-i | 6.9 | 1.4 |
| C₂H₅ | CH₃ | C₄H₉-i | 6.3 | 1.6 |
| CH₃ | CH₃ | C₅H₁₁-n | 6.7 | 0.6 |
| C₂H₅ | CH₃ | C₅H₁₁-n | 6.4 | 1.3 |
| CH₃ | CH₃ | C₅H₁₁-n | 6.6 | 1.9 |
| C₂H₅ | CH₃ | C₅H₁₁-n | 6.4 | 1.3 |
| (CH₂)₃OCH₃ | CH₃ | CH₃ | 7.3 | 2.3 |
| (CH₂)₃OCH₃ | CH₃ | C₂H₅ | 7.4 | 1.4 |
| (CH₂)₃OCH₃ | CH₃ | C₃H₇-i | 6.7 | 1.0 |
| C₂H₅ | H | CH₃ | 6.0 | 4.3 |
| C₃H₇-i | H | CH₃ | 6.9 | 3.6 |

TABLE 3
[X=—SCH₃; $R^1$=H]

| $R^2$ | $R^3$ | $R^4$ | Leaf treatment | Pre-emergence soil treatment |
|---|---|---|---|---|
| H | CH₃ | CH₃ | 7.4 | 4.0 |
| CH₃ | CH₃ | CH₃ | 7.9 | 6.4 |
| C₂H₅ | CH₃ | CH₃ | 7.7 | 4.3 |
| C₃H₇-i | CH₃ | CH₃ | 7.6 | 6.2 |

| R² | R³ | R⁴ | Leaf treatment | Pre-emergence soil treatment |
|---|---|---|---|---|
| C₄H₉-n | CH₃ | CH₃ | 7.1 | 2.3 |
| H | CH₃ | C₂H₅ | 7.4 | 5.0 |
| CH₃ | CH₃ | C₂H₅ | 7.9 | 3.9 |
| C₂H₅ | CH₃ | C₂H₅ | 8.2 | 5.4 |
| C₃H₇-i | CH₃ | C₂H₅ | 7.7 | 3.9 |
| C₂H₅ | CH₃ | C₃H₇-n | 7.6 | 3.1 |
| CH₃ | CH₃ | C₃H₇-i | 7.4 | 3.4 |
| C₂H₅ | CH₃ | C₃H₇-i | 7.6 | 3.0 |
| C₃H₇-i | CH₃ | C₃H₇-i | 7.4 | 2.3 |
| CH₃ | C₂H₅ | C₂H₅ | 7.4 | 4.6 |
| C₂H₅ | C₂H₅ | C₂H₅ | 7.4 | 4.9 |
| C₃H₇-i | C₂H₅ | C₂H₅ | 7.7 | 2.1 |
| H | CH₃ | C₅H₁₁-n | 6.9 | 0.9 |
| C₂H₅* | CH₃ | CH₃ | 7.4 | 4.3 |
| CH₃ | CH₃ | C₅H₁₁-i | 7.0 | 1.3 |
| C₂H₅ | CH₃ | C₅H₁₁-i | 6.7 | 1.3 |
| CH₂CH=CH₂ | CH₃ | CH₃ | 7.4 | 4.6 |
| (CH₂)₃SCH₃ | CH₃ | CH₃ | 6.9 | 1.1 |
| (CH₂)₂OCH₃ | CH₃ | CH₃ | 7.4 | 4.0 |
| CH₂CH₂OH | CH₃ | CH₃ | 7.0 | 0 |
| OC₂H₅ | CH₃ | CH₃ | 7.1 | 3.4 |
| CH₃ | -NH-C₆H₁₀-H (cyclohexyl NC) | | 7.0 | 1.9 |
| C₂H₅ | -NH-C₆H₁₀-H (cyclohexyl NC) | | 7.4 | 2.4 |
| C₃H₇-i | -NH-C₆H₁₀-H (cyclohexyl NC) | | 6.7 | 1.3 |
| C₃H₇-i | H | CH₃ | 7.7 | 5.1 |

*R¹=C₂H₅.

TABLE 4
[X=SC₂H₅; R¹=H]

| R² | R³ | R⁴ | Leaf treatment | Pre-emergence soil treatment |
|---|---|---|---|---|
| C₂H₅ | CH₃ | CH₃ | 7.7 | 4.1 |
| C₂H₅ | CH₃ | C₂H₅ | 7.4 | 2.6 |

TABLE 5a
[X=OCH₃; R¹=H]

| R² | R³ | R⁴ | Leaf treatment | Pre-emergence soil treatment |
|---|---|---|---|---|
| H | CH₃ | CH₃ | 7.4 | 6.0 |
| CH₃ | CH₃ | CH₃ | 7.6 | 6.6 |
| C₂H₅ | CH₃ | CH₃ | 7.8 | 6.8 |
| C₃H₇-i | CH₃ | CH₃ | 8.0 | 5.7 |
| H | CH₃ | C₂H₅ | 7.7 | 5.1 |
| C₂H₅ | CH₃ | C₂H₅ | 7.7 | 5.4 |
| CH₃ | CH₃ | C₃H₇-i | 7.4 | 4.9 |
| C₂H₅ | CH₃ | C₃H₇-i | 8.0 | 4.6 |
| C₃H₇-i | CH₃ | C₃H₇-i | 7.6 | 3.6 |
| CH₃ | C₂H₅ | C₂H₅ | 7.3 | 4.3 |
| C₂H₅ | C₂H₅ | C₂H₅ | 7.3 | 4.4 |
| CH₃ | CH₃ | C₅H₁₁-n | 6.6 | 2.6 |
| C₂H₅* | CH₃ | CH₃ | 7.4 | 4.3 |
| (CH₂)₃OCH₃ | CH₃ | CH₃ | 6.9 | 4.0 |
| (CH₂)₃OC₂H₅ | CH₃ | CH₃ | 7.0 | 3.1 |
| C₂H₅ | H | CH₃ | 7.4 | 6.0 |
| (CH₂)₃OCH₃ | H | CH₃ | 6.0 | 4.3 |

*R¹=C₂H₅.

TABLE 5b
[X=OC₃H₆; R¹=H]

| R² | R³ | R⁴ | Leaf treatment | Pre-emergence soil treatment |
|---|---|---|---|---|
| C₂H₅ | CH₃ | CH₃ | 7.7 | 5.7 |
| C₂H₅ | CH₃ | C₂H₅ | 7.0 | 4.3 |
| C₂H₅* | CH₃ | C₂H₅ | 6.4 | 1.3 |

*X=NHC₂H₅.

TABLE 6.—KNOWN COMPOUNDS

| Substituent in position 2 | 4 | 6 | Leaf treatment | Pre-emergence soil treatment |
|---|---|---|---|---|
| Cl | -NHC₂H₅ | -NH(CH₂)₂CN | 2.4 | 2.0 |
| Cl | -NHC₃H₇-i | -NH(CH₂)₂CN | 4.1 | 1.0 |
| N₃ | -SCH₃ | -NH(CH₂)₂CN | 2.9 | 1.0 |
| Cl | -NHC₂H₅ | -NCH₂H₅ | 3.6 | 3.3 |
| Cl | -NHC₂H₅ | -NCH₃H₇-i | 5.9 | 4.1 |
| Cl | -NHC₂H₅ | -NHCH₂CN | 1.6 | 1.6 |
| Cl | -NHC₃H₇-i | -NHCH₂CN | 0.6 | 0.3 |
| Cl | -NH₂ | -NHCH₂CN | 1.1 | 0 |
| Cl | -NHCH₃ | -NHCH₂CN | 2.1 | 0.4 |
| Cl | -NHC₂H₅ | -NHC(CH₃)₂COOH | 0 | 0 |
| Cl | -NHC₂H₅ | -NHC(CH₃)₂CONH₂ | 0 | 0 |
| Cl | -NHC₂H₅ | -NHC(CH₃)₂COOCH₃ | 0.2 | 0.2 |

EXAMPLE 26

The following procedure was used to determine the ability of the compounds according to the invention to decompose in soil:

Air dried loam was brought to a moisture content of 20 percent. The active substances tested were introduced into 2 kg. portions of such soil as a solution in 5 ml. of acetone to provide a concentration of active substance corresponding to 0.3 kg./hectare. The treated soil was stored in covered plastic containers for varying lengths of time at a constant temperature of 21° C.

After various periods of storage, samples were removed and placed in pots in which sugar beet seedlings were transplanted. The pots were watered from below and held at 21° C. in a greenhouse. The phytotoxicity was determined 1 week after the transplanting. The following table gives the percentage of the plants destroyed.

TABLE

| | Destruction of the plants in percent after storage | | | | |
|---|---|---|---|---|---|
| Weeks | 0 | 1 | 2 | 3 | 4 |
| Compounds: | | | | | |
| Cl/-NHC₂H₅/-NH-C(CH₃)₂CN | 95 | | 75 | 30 | 5 |
| Cl/-NHCH₃/-NH-C(CH₃)₂CN | 95 | | | | 5 |
| Cl/-NHC₃H₇-i/-NH-C(CH₃)₂CN | 95 | | | | 70 |
| CH₃S/-NHC₂H₅/-NH-C₆H₁₀-H (cyclohexyl NC) | 95 | | | | 5 |
| Cl/-NHC₂H₅/-NHC₃H₇-i (comparison) | 95 | 95 | 95 | 95 | 95 |

EXAMPLE 27

The herbicidal activity of the following compounds was tested:

I  2-ethylamino-4-(1-cyanoethyl)-amino-6-chloro-s-triazine
II  2-isopropylamino-4-(1-cyanoethyl)-amino-6-chloro-s-triazine
III  2-ethylamino-4-cyanomethylamino-6-chloro-triazine (prior art)
IV  2-ethylamino-4-(2-cyanoethyl)-amino-6-chloro-s-triazine (prior art)
V  2,4-bis-ethylamino-6-chloro-s-triazine (prior art)

The tests were as follows:

a. Post-emergence soil treatment:

Various seeds were raked into soil in a greenhouse maintained at 21° C. After sprouting, a dispersion obtained by pouring a solution of the herbicide in equal quantities of water was applied to the soil. After 2 weeks it was determined if and to what extent the plant growth had been reduced.

b. Leaf treatment:

The procedure described under (a) was followed except that the herbicide was applied to the plant leaves rather than to the soil.

The results of the tests are given in the following tables. The growth was evaluated according to a scale ranging from 0 to 9 in which 0 signifies normal growth and 9 total destruction of the plant.

The active substance concentration in each instance was 1 kg./hectare.

TABLE

| Substance tested | Corn | Oats | Rye-grass | Peas | Lin-seed | Mus-tard | Sugar beet |
|---|---|---|---|---|---|---|---|
| (a) Post-emergence soil treatment | | | | | | | |
| I | 1 | 7 | 7 | 6 | 9 | 9 | 9 |
| II | 1 | 7 | 6 | 5 | 9 | 9 | 9 |
| III | 0 | 0 | 0 | 1 | 4 | 5 | 1 |
| IV | 0 | 0 | 0 | 3 | 6 | 7 | 1 |
| V | 0 | 3 | 2 | 4 | 3 | 7 | 6 |
| (b) Leaf treatment | | | | | | | |
| I | 0 | 7 | 7 | 0 | 9 | 9 | 9 |
| II | 0 | 6 | 2 | 0 | 9 | 7 | 9 |
| III | 0 | 0 | 0 | 0 | 0 | 5 | 6 |
| IV | 0 | 2 | 0 | 0 | 4 | 2 | 6 |
| V | 0 | 2 | 4 | 0 | 4 | 6 | 7 |

EXAMPLE 28

A young mixed flora of lolium perenne, digitaria sanguinalis, alopecurus pratensis, agropyren repens and plantago lanceolata was sprayed once with a 0.5 percent emulsion of the following substances:
1. 2-ethylamino-4-(1-cyanoethyl)-amino-6-methoxy-s-triazine
2. 2-ethylamino-4-(1-cyanoethyl)-amino-6-methyl-mercapto-s-triazine
3. 2-methylamino-4-(1-cyanopropyl)-amino-6-azido-s-triazine After 18 days all plants were totally destroyed.

EXAMPLE 29

A mixed flora of corn, wheat, barley, cotton, digitaria sanguinalis (crab grass), plantago lanceolata (plantain), cichorium endivia (chickory), echinochloa crus-galli (barnyard grass), amaranthus retroflexus (pigweed), cabbage and sugar beets was treated prior to emergence with various triazines and compared with a known commercial product. In each instance the quantity of herbicide (kg./hectare) which was required for destruction of 10, 50 and 90 percent of the plants.

Substance (VI), 2-ethylamino-4-isopropylamino-6-chloro-triazine was selected as the comparison substance.

All compounds corresponded to the formula

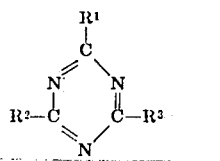

| Substance No. | $R^1$ | $R^2$ | $R^3$ |
|---|---|---|---|
| V1 | Cl | $NHC_2H_5$ | $NHC_3H_7$-i |
| V2 | Cl | $NHC_2H_5$ | NH—CH—CN<br>\|<br>$CH_3$ |
| V3 | Cl | $NHC_2H_5$ | NH—CH—CN<br>\|<br>$C_2H_5$ |
| V4 | Cl | $NHC_2H_5$ | NH—CH—CN<br>\|<br>$C_3H_7$-n |
| V5 | Cl | $NHCH_3$ | NH—CH—CN<br>\|<br>$C_3H_7$-i |
| V6 | Cl | $NHC_2H_5$ | NH—CH—CN<br>\|<br>$C_3H_7$-i |
| V7 | $OCH_3$ | $NHC_2H_5$ | NH—CH—CN<br>\|<br>$CH_3$ |

The results of the tests are given in the following table.

The table indicates that, for instance, compounds V4 and V5 have considerably stronger selectivity in cereals such as wheat and barley than the comparison substance V1. It can furthermore be noted that compounds V2 and V3 in comparison with V1 have a stronger action against crab grass and barnyard grass while maintaining their selectivity in corn.

EXAMPLE 30

2-ethylamino-4-(1-cyanoethyl)-amino-6-chloro-s-triazine was tested as to its ability to decompose in soil using the method disclosed in example 26 but using a concentration of active substance corresponding to 0.01 kg./hectare. The half value time for such a compound was 2.5 weeks. In comparison, the half value time of 2-ethyl-amino-4-isopropylamino-6-chloro-s-triazine when tested under the same conditions was 6 weeks.

I claim:
1. Herbicidal composition comprising (a) an effective amount of a cyanoalkyl-amino substituted triazine of the formula

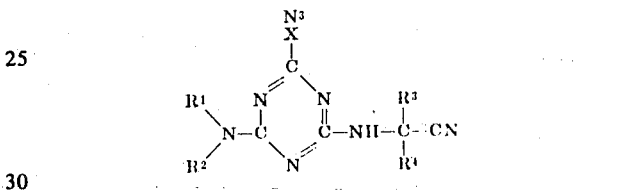

wherein X is selected from the group consisting of halogen, lower alkoxy, lower alkyl mercapto, being hydrogen, lower alkyl, lower alkenyl, substituted lower alkyl or substituted lower alkenyl in which latter two groups the substituents are –OH, –OR, –SR or –CN, R being lower alkyl, and wherein one of $R^3$ and $R^4$ is alkyl or alkenyl having from one to eight carbon atoms and the other is hydrogen, alkyl or alkenyl having from one to eight carbon atoms, and wherein $R^3$ and $R^4$ together with the adjoining carbon atom may form a 5 to 7 member cycloalkyl ring; and (b) an agriculturally acceptable carrier for said triazine compound.

2. The composition of claim 1, which is in the form of a sprayable solution, the carrier being an organic solvent for said triazine compound.

3. The composition of claim 1, wherein the carrier is in solid form.

4. The herbicidal composition of claim 3, wherein the solid carrier is selected from the group consisting of alumina, kaolin, kieselguhr, bentonite, talc, finely ground calcium carbonate, charcoal and wood flour.

5. The composition of claim 1, which is in the form of a suspension, the carrier being a suspension medium.

6. The composition of claim 5, which includes at least one of the following: stabilizers, wetting agents, emulsifiers and adhesives.

TABLE

| V No. | | Corn | Wheat | Barley | Cotton | Dig. sang. | Plant. lanc. | Cich. | Echin. | Amar. | Cabbage | Sugar beet |
|---|---|---|---|---|---|---|---|---|---|---|---|---|
| V1 | 10 | >5 | 0.22 | 0.28 | 3.4 | 0.28 | <0.2 | <0.2 | 0.23 | <0.2 | <0.2 | 0.2 |
| | 50 | | 0.82 | 1.1 | >5 | 0.6 | <0.2 | 0.56 | <0.2 | <0.2 | <0.2 | 0.35 |
| | 90 | | >5 | >5 | | 2.7 | 0.28 | 0.48 | >4.2 | <0.2 | 0.29 | 0.6 |
| V2 | 10 | >5 | 0.08 | 0.05 | <0.04 | 0.03 | 0.03 | 0.03 | 0.03 | | <0.02 | <0.02 |
| | 50 | | 0.27 | 0.08 | <0.04 | 0.07 | 0.04 | 0.04 | 0.12 | | <0.02 | <0.02 |
| | 90 | | 1.0 | 1.0 | 0.06 | 0.46 | 0.12 | 0.13 | 0.45 | | 0.03 | 0.06 |
| V3 | 10 | >5 | 0.22 | 0.14 | 0.64 | 0.1 | <0.05 | 0.06 | 0.06 | 0.08 | 0.05 | 0.05 |
| | 50 | | 0.7 | 0.44 | 1.6 | 0.14 | 0.1 | 0.05 | 0.13 | 0.14 | 0.06 | 0.05 |
| | 90 | | >2 | 1.4 | >2 | 0.19 | 0.3 | 0.08 | 0.34 | 0.23 | 0.11 | 0.11 |
| V4 | 10 | >5 | 0.12 | 0.48 | 1.7 | 0.11 | 0.1 | <0.11 | 0.15 | <0.09 | <0.11 | <0.11 |
| | 50 | | 2.7 | 1.4 | 3.6 | 0.2 | 0.16 | <0.11 | 0.27 | <0.09 | 0.11 | <0.11 |
| | 90 | | >4 | >4 | >4 | 0.36 | 0.26 | 0.14 | 0.5 | 2.3 | 0.18 | 0.14 |
| V5 | 10 | >5 | <0.11 | <0.11 | 1.5 | 0.2 | 0.2 | <0.11 | 0.14 | <0.09 | <0.11 | <0.11 |
| | 50 | | >4 | 1.5 | >4 | 0.38 | 0.36 | <0.11 | 0.19 | 0.11 | 0.16 | <0.11 |
| | 90 | | | >4 | | 0.7 | 0.46 | 0.14 | 0.62 | 0.26 | 0.25 | <0.11 |
| V6 | 10 | >5 | 0.12 | 0.21 | 0.85 | <0.09 | 0.1 | <0.11 | <0.11 | <0.09 | <0.11 | <0.11 |
| | 50 | | 1.5 | 0.7 | 1.85 | 0.43 | 0.16 | <0.11 | 0.3 | <0.09 | <0.11 | <0.11 |
| | 90 | | >4 | 2.4 | 4 | 2.2 | 0.24 | 0.16 | 1.2 | 0.15 | 0.25 | 0.16 |
| | 10 | 0.3 | 0.1 | 0.1 | 0.7 | <0.05 | <0.05 | | | | <0.05 | |

7. The composition of claim 1, wherein the compound both $R^3$ and $R^4$ are alkyl or alkenyl having from one to eight carbon atoms and wherein $R^3$ and $R^4$ together with the adjoining carbon atom may form a five to seven member cycloalkyl ring.

8. The composition of claim 1, wherein in the triazine compound one of $R^1$ and $R^2$ is hydrogen and the other is lower alkyl, lower alkenyl, substituted lower alkyl or substituted lower alkenyl, the substituents in the latter two groups being as defined in claim 1.

9. The composition of claim 1, wherein in the triazine compound X is halogen.

10. The composition of claim 1, wherein in the triazine compound X is chlorine.

11. The composition of claim 1, wherein in the triazine compound X is chlorine, and in which one of $R^1$ and $R^2$ is hydrogen and the other is lower alkyl, lower alkenyl, substituted lower alkyl or substituted lower alkenyl, the substitutions in the latter two groups being as defined in claim 1, and in which both $R^3$ and $R^4$ are alkyl or alkenyl having form one to eight carbon atoms and wherein $R^3$ and $R^4$ together with the adjoining carbon atom may form a five to seven member cycloalkyl ring.

12. The composition of claim 1, wherein the triazine compound is 2-chloro-4-ethylamino-6-(1-cyano-1-methyl-ethyl)-amino triazine.

13. The composition of claim 1, wherein the triazine compound is 2-chloro-4-ethylamino-6-(1-cyano-1-methyl-propyl)-amino-triazine.

14. The composition of claim 1, wherein the triazine compound is 2-chloro-4-methylamino-6-(1-cyano-1-methyl-ethyl)-amino-triazine.

15. The composition of claim 1, wherein the triazine compound is 2-methoxy-4-ethylamino-6-(1-cyano-1-methyl-ethyl)-amino-triazine 16. The composition of claim 1, wherein the triazine compound is 2-methyl-mercapto-4-ethyl-amino-6-(1-cyano-1-methyl-ethyl)-amino-triazine.

17. The method of controlling the growth of plants comprising applying a composition as defined in claim 1 to the plants or to the soil prior to or after emergence of said plants.

* * * * *